(12) United States Patent
Dawson et al.

(10) Patent No.: US 8,745,242 B2
(45) Date of Patent: Jun. 3, 2014

(54) CLOUD COMPUTING ROAMING SERVICES

(75) Inventors: Christopher J. Dawson, Arlington, VA (US); Vincenzo V. Diluoffo, Sandy Hook, CT (US); Michael D. Kendzierski, New York, NY (US); James W. Seaman, Falls Church, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/563,148

(22) Filed: Jul. 31, 2012

(65) Prior Publication Data

US 2012/0297071 A1    Nov. 22, 2012

Related U.S. Application Data

(63) Continuation of application No. 12/630,230, filed on Dec. 3, 2009, now Pat. No. 8,271,655.

(51) Int. Cl.
*G06F 15/173* (2006.01)

(52) U.S. Cl.
USPC ............................ 709/226; 709/227; 709/229

(58) Field of Classification Search
USPC .......................................... 709/226, 227, 229
See application file for complete search history.

(56) References Cited

U.S. PATENT DOCUMENTS

| | | | |
|---|---|---|---|
| 6,564,055 B1 | 5/2003 | Hronck | |
| 6,925,299 B1 | 8/2005 | Sofer et al. | |
| 7,310,511 B2 | 12/2007 | Barnea et al. | |
| 7,574,496 B2 | 8/2009 | McCrory et al. | |
| 2003/0014297 A1 | 1/2003 | Kaufman et al. | |
| 2003/0051021 A1 | 3/2003 | Hirschfeld et al. | |
| 2003/0105810 A1 | 6/2003 | McCrory et al. | |
| 2007/0237096 A1 | 10/2007 | Vengroff et al. | |

(Continued)

FOREIGN PATENT DOCUMENTS

WO    PCT 2010067508    3/2011

OTHER PUBLICATIONS

Maghraoui, K., "A Framwork for the Dynamic Reconfiguration of Scientific Applications in Grid Environments", Thesis submitted for May 2007 Graduation at Rensselaer Polytechnic Institute, Troy, New York, Copyright 2007, 168 pages.

(Continued)

*Primary Examiner* — Tammy Nguyen
*Assistant Examiner* — Jonathan Bui
(74) *Attorney, Agent, or Firm* — William E. Schiesser; Hunter E. Webb; Keohane & D'Alessandro PLLC (57) ABSTRACT

The present invention provides approaches for Cloud roaming services. It allows Cloud services to be offered to requestors that are abstracted from the underlying Cloud provider used to fulfill those services. The present invention provides the ability for Cloud providers to be dynamically associated with currently available Cloud services for requestors. The system and method describes two scenarios—a pull and push model—to align requestor required services to currently available services from Cloud providers. The requestor has a profile determining a prioritized list of Cloud providers that may be used, OR the primary Cloud provider may outsource services to a partner cloud. The algorithm shows how the provider decides which requestors have access to which services—based on current utilization and forecast. Also, location, roaming, network bandwidth and requestor processing capabilities may be sent to the provider of Cloud services to determine whether a change is needed.

22 Claims, 5 Drawing Sheets

(56) References Cited

U.S. PATENT DOCUMENTS

| | | |
|---|---|---|
| 2008/0080396 A1* | 4/2008 | Meijer et al. .................. 370/254 |
| 2009/0157471 A1 | 6/2009 | Burgess, Jr. et al. |
| 2009/0164994 A1 | 6/2009 | Vasilevsky et al. |
| 2010/0042720 A1 | 2/2010 | Stienhans et al. |
| 2010/0050172 A1* | 2/2010 | Ferris ................................ 718/1 |
| 2010/0076988 A1 | 3/2010 | Kenedy et al. |
| 2010/0125664 A1 | 5/2010 | Hadar et al. |
| 2010/0192212 A1 | 7/2010 | Raleigh |
| 2010/0235903 A1 | 9/2010 | Carter et al. |
| 2010/0290392 A1 | 11/2010 | Rasamen et al. |
| 2010/0306377 A1 | 12/2010 | DeHaan et al. |
| 2010/0306379 A1 | 12/2010 | Ferris |
| 2010/0312809 A1 | 12/2010 | Calder et al. |
| 2010/0332324 A1 | 12/2010 | Khosravy et al. |
| 2011/0016214 A1* | 1/2011 | Jackson ......................... 709/226 |
| 2011/0022642 A1 | 1/2011 | deMilo et al. |
| 2011/0029670 A1 | 2/2011 | Klein et al. |

OTHER PUBLICATIONS

Batista, D. et al., "A Brief Survey on Resource Allocation in Service Oriented Grids", Institute of Computing, State University of Campinas, Brazil, 5 pages.

Bradley, "Windows 7 Moves People to the Cloud", Sep. 14, 2009, www.itworld.com.

Chung, R., "Behind Live Mesh: What is MOE?", May 9, 2009, http://blogs.msdn.com/livemesh/archive/2008/05/09/ behind-live-mesh-what-is-moe.aspx.

Mell, et al., "The NIST Definition of Cloud Computing", National Institute of Standards and Technology, Information Technology Laboratory, Version 15, Oct. 7, 2009, 2 pages.

Maitland, J., "Keeping Control Isn't Easy", Chapter 4: Cloud-Based Infrastructure. SearchCloudComputing.com, 13 pages.

* cited by examiner

FIG. 5

CLOUD COMPUTING ROAMING SERVICES

CROSS-REFERENCE TO RELATED APPLICATION

This application is a continuation of, and claims the benefit of, co-pending and co-owned U.S. patent application Ser. No. 12/630,230, filed Dec. 3, 2009, the entire contents of which are herein incorporated by reference.

FIELD OF THE INVENTION

The present invention provides a solution for Cloud roaming services. Specifically, the present invention provides an approach for a requestor of Cloud services to roam between Cloud providers based on the needs and/or capabilities of the requestor or the Cloud providers.

BACKGROUND OF THE INVENTION

Cloud computing has become a popular way to offer various Information Technology (IT) concepts as services. In one implementation, a consumer or requestor can request a service they desire and transact with a Cloud provider for the needed service. In this implementation, the requestor will only have to transact for the service they need without maintaining their own infrastructure and/or being forced to purchase services they do not need. Unfortunately, no existing system provides a way to measure the needs/capabilities of requestors and/or match requestors with Cloud providers in a way that makes the most sense.

SUMMARY OF THE INVENTION

The present invention provides a system and method to provide Cloud roaming services. It allows Cloud services to be offered to customers/requestors that are abstracted from the underlying Cloud provider used to fulfill those services. The present invention provides the ability for Cloud providers to be dynamically associated with currently available Cloud services for requestors. The system and method describes two scenarios—a pull and push model—to align requestor-required services to currently available services from Cloud providers. The requestor has a profile determining a prioritized list of Cloud providers that may be used, OR the primary Cloud provider may outsource services to a partner cloud. The algorithm shows how the provider decides which requestors have access to which services, based on current utilization and forecast. Also, from a requestor perspective, location, roaming, network bandwidth, and requestor processing capabilities (not inclusive) may be sent to the provider of Cloud services to determine whether a change is needed.

A first aspect of the present invention provides a method for providing Cloud roaming services in a Cloud computing environment, comprising: receiving a request for a Cloud service from a requestor in the Cloud computing environment; determining a set of Cloud providers capable of providing the requested Cloud service based on a profile of the requestor and a capability of each of the set of Cloud providers; and making a selection to match the requester with at least one of the set of Cloud providers based upon a match between the profile and the capability, wherein the matching can be initiated and controlled by the requester, by analyzing the set of Cloud providers to determine a Cloud to fulfill the request, and the at least one of the set of Cloud providers, by analyzing the profile of the requester and indicating an availability and capability to the requester.

A second aspect of the present invention provides a Cloud system for providing Cloud roaming services in a Cloud computing environment, comprising: a memory medium comprising instructions; a bus coupled to the memory medium; a processor coupled to the bus that when executing the instructions causes the Cloud system to: receive a request for a Cloud service from a requestor in the Cloud computing environment; determine a set of Cloud providers capable of providing the requested Cloud service based on a profile of the requestor and a capability of each of the set of Cloud providers; and make a selection to match the requester with at least one of the set of Cloud providers based upon a match between the profile and the capability, wherein the matching can be initiated and controlled by the requester, by analyzing the set of Cloud providers to determine a Cloud to fulfill the request, and the at least one of the set of Cloud providers, by analyzing the profile of the requester and indicating an availability and capability to the requester.

A third aspect of the present invention provides a computer readable medium containing a program product for providing Cloud roaming services in a Cloud computing environment, the computer readable medium comprising program code for causing a computer to: receive a request for a Cloud service from a requestor in the Cloud computing environment; determine a set of Cloud providers capable of providing the requested Cloud service based on a profile of the requestor and a capability of each of the set of Cloud providers; and make a selection to match the requester with at least one of the set of Cloud providers based upon a match between the profile and the capability, wherein the matching can be initiated and controlled by the requester, by analyzing the set of Cloud providers to determine a Cloud to fulfill the request, and the at least one of the set of Cloud providers, by analyzing the profile of the requester and indicating an availability and capability to the requester.

A fourth aspect of the present invention provides a method for deploying a system for providing Cloud roaming services in a Cloud computing environment, comprising: providing a Cloud computing system being operable to: receive a request for a Cloud service from a requestor in the Cloud computing environment; determine a set of Cloud providers capable of providing the requested Cloud service based on a profile of the requestor and a capability of each of the set of Cloud providers; and make a selection to match the requester with at least one of the set of Cloud providers based upon a match between the profile and the capability, wherein the matching can be initiated and controlled by the requester, by analyzing the set of Cloud providers to determine a Cloud to fulfill the request, and the at least one of the set of Cloud providers, by analyzing the profile of the requester and indicating an availability and capability to the requester.

BRIEF DESCRIPTION OF THE DRAWINGS

These and other features of this invention will be more readily understood from the following detailed description of the various aspects of the invention taken in conjunction with the accompanying drawings in which.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION OF THE INVENTION

For convenience, the Detailed Description of the invention has the following sections:

I. Cloud Computing Definitions
II. Detailed Implementation of the Invention

I. Cloud Computing Definitions

The following definitions have been derived from the "Draft NIST Working Definition of Cloud Computing" by Peter Mell and Tim Grance, dated Oct. 7, 2009, which is cited on an IDS filed herewith, and a copy of which is attached thereto.

Cloud computing is a model for enabling convenient, on-demand network access to a shared pool of configurable computing resources (e.g., networks, servers, storage, applications, and services) that can be rapidly provisioned and released with minimal management effort or service provider interaction. This Cloud model promotes availability and is comprised of at least five characteristics, at least three service models, and at least four deployment models.

Characteristics are as follows:

On-demand self-service: A consumer can unilaterally provision computing capabilities, such as server time and network storage, as needed, automatically without requiring human interaction with each service's provider.

Broad network access: Capabilities are available over a network and accessed through standard mechanisms that promote use by heterogeneous thin or thick client platforms (e.g., mobile phones, laptops, and PDAs).

Resource pooling: The provider's computing resources are pooled to serve multiple consumers using a multi-tenant model, with different physical and virtual resources dynamically assigned and reassigned according to consumer demand. There is a sense of location independence in that the customer generally has no control or knowledge over the exact location of the provided resources but may be able to specify location at a higher level of abstraction (e.g., country, state, or datacenter). Examples of resources include storage, processing, memory, network bandwidth, and virtual machines.

Rapid elasticity: Capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: Cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Cloud Software as a Service (SaaS): The capability provided to the consumer is to use the provider's applications running on a Cloud infrastructure. The applications are accessible from various client devices through a thin client interface such as a web browser (e.g., web-based e-mail). The consumer does not manage or control the underlying Cloud infrastructure including network, servers, operating systems, storage, or even individual application capabilities, with the possible exception of limited user-specific application configuration settings.

Cloud Platform as a Service (PaaS): The capability provided to the consumer is to deploy onto the Cloud infrastructure consumer-created or acquired applications created using programming languages and tools supported by the provider. The consumer does not manage or control the underlying Cloud infrastructure including networks, servers, operating systems, or storage, but has control over the deployed applications and possibly application hosting environment configurations.

Cloud Infrastructure as a Service (IaaS): The capability provided to the consumer is to provision processing, storage, networks, and other fundamental computing resources where the consumer is able to deploy and run arbitrary software, which can include operating systems and applications. The consumer does not manage or control the underlying Cloud infrastructure but has control over operating systems, storage, deployed applications, and possibly limited control of select networking components (e.g., host firewalls).

Deployment Models are as follows:

Private cloud: The Cloud infrastructure is operated solely for an organization. It may be managed by the organization or a third party and may exist on-premises or off-premises.

Community cloud: The Cloud infrastructure is shared by several organizations and supports a specific community that has shared concerns (e.g., mission, security requirements, policy, and compliance considerations). It may be managed by the organizations or a third party and may exist on-premises or off-premises.

Public cloud: The Cloud infrastructure is made available to the general public or a large industry group and is owned by an organization selling Cloud services.

Hybrid cloud: The Cloud infrastructure is a composition of two or more clouds (private, community, or public) that remain unique entities but are bound together by standardized or proprietary technology that enables data and application portability (e.g., Cloud bursting for load-balancing between clouds).

A Cloud computing environment is service oriented with a focus on statelessness, low coupling, modularity, and semantic interoperability.

II. Implementation of the Invention

As indicated above, the present invention provides a system and method to provide Cloud roaming services. It allows Cloud services to be offered to customers/requestors that are abstracted from the underlying Cloud provider used to fulfill those services. The present invention provides the ability for Cloud providers to be dynamically associated with currently available Cloud services for requestors. The system and method describes two scenarios—a pull and push model—to align requestor required services to currently available services from Cloud providers. The requestor has a profile determining a prioritized list of Cloud providers that may be used, OR the primary Cloud provider may outsource services to a partner cloud. The algorithm shows how the provider decides which requestors have access to which services—based on current utilization and forecast. Also, from a requestor perspective, location, roaming, network bandwidth, and requestor processing capabilities (not inclusive) may be sent to the provider of Cloud services to determine whether a change is needed.

Along these lines, the present invention provides a solution for Cloud roaming services. It allows Cloud services to be offered to requestors that are abstracted from the underlying Cloud provider used to fulfill those services. The present invention provides the ability for Cloud providers to be dynamically associated with currently available Cloud services for requestors.

Figure 1:
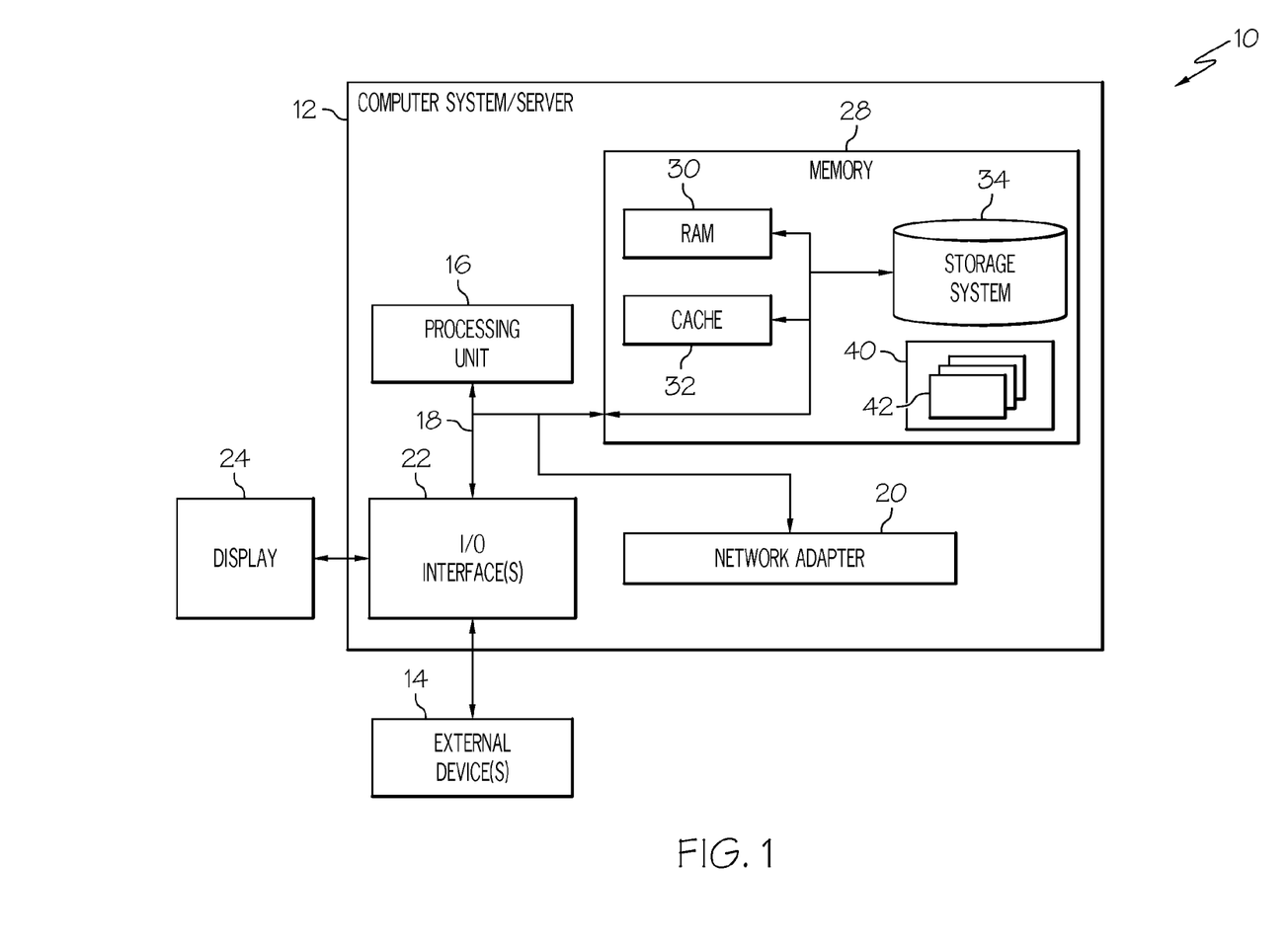
FIG. 1 shows a Cloud system node according to the present invention.

Referring now to FIG. 1, a schematic of an exemplary Cloud computing node is shown. Cloud computing node 10 is only one example of a suitable Cloud computing node and is not intended to suggest any limitation as to the scope of use or functionality of the invention described herein. Regardless, Cloud computing node 10 is capable of being implemented and/or performing any of the functions set forth in section I above.

In Cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed Cloud computing environments that include any of the above systems or devices, and the like.

Computer system/server 12 may be described in the general context of computer system-executable instructions, such as program modules, being executed by a computer system. Generally, program modules include routines, programs, objects, components, logic, data structures, and so on that perform particular tasks or implement particular abstract data types. The exemplary computer system/server 12 may be practiced in distributed Cloud computing environments where tasks are performed by remote processing devices that are linked through a communications network. In a distributed Cloud computing environment, program modules may be located in both local and remote computer system storage media including memory storage devices.

As shown in FIG. 1, computer system/server 12 in Cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, a hard disk drive 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of the invention.

Program/utility 40 having a set (at least one) of program modules 42 may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via I/O interface(s) 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
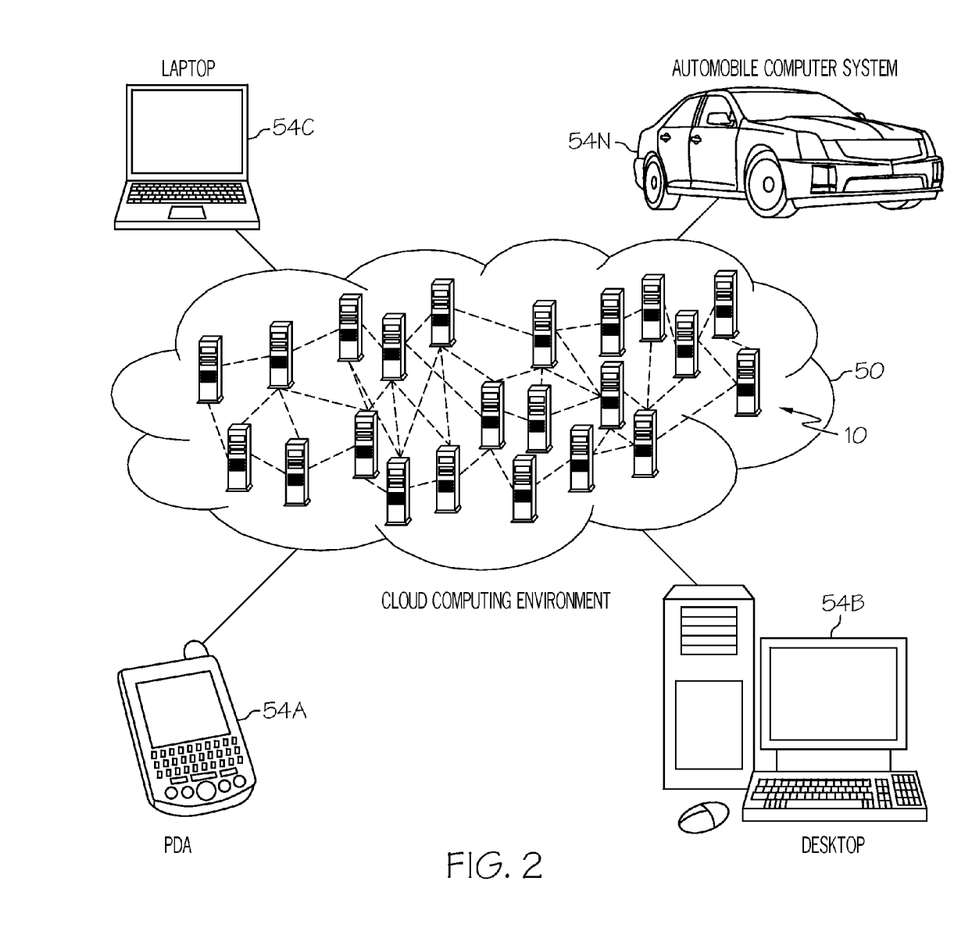
FIG. 2 shows a Cloud computing environment according to the present invention.

Referring now to FIG. 2, illustrative Cloud computing environment 50 is depicted. As shown, Cloud computing environment 50 comprises one or more Cloud computing nodes 10 with which computing devices such as, for example, personal digital assistant (PDA) or cellular telephone 54A, desktop computer 54B, laptop computer 54C, and/or automobile computer system 54N communicate. This allows for infrastructure, platforms and/or software to be offered as services (as described above in Section I) from Cloud computing environment 50, so as to not require each client to separately maintain such resources. It is understood that the types of computing devices 54A-N shown in FIG. 2 are intended to be illustrative only and that Cloud computing environment 50 can communicate with any type of computerized device over any type of network and/or network/addressable connection (e.g., using a web browser).

Figure 3:
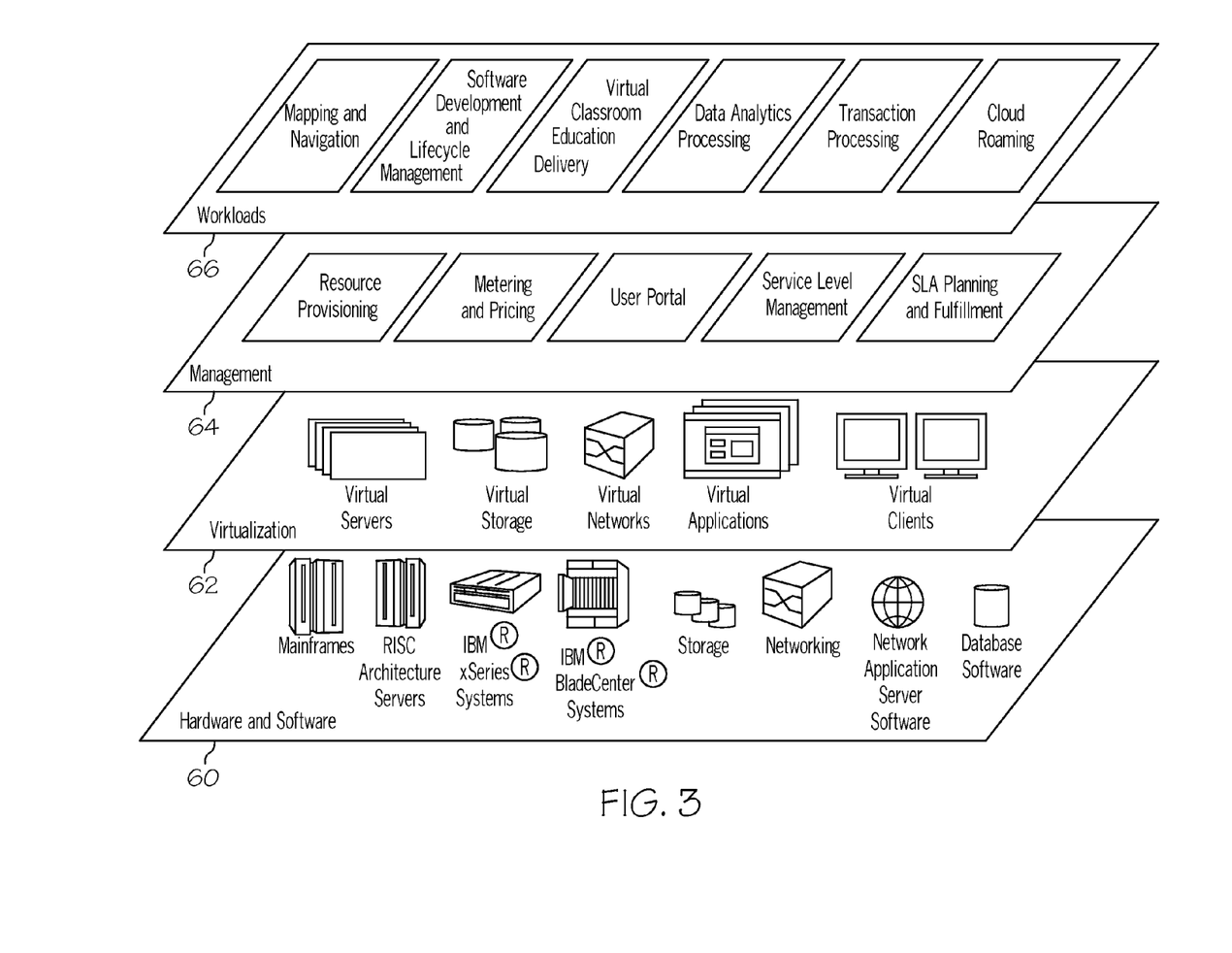
FIG. 3 shows Cloud abstraction model layers according to the present invention.

Referring now to FIG. 3, a set of functional abstraction layers provided by Cloud computing environment 50 (FIG. 2) is shown. It should be understood in advance that the components, layers, and functions shown in FIG. 3 are intended to be illustrative only, and the invention is not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM xSeries® systems, IBM BladeCenter® systems, storage devices, networks, and networking components. Examples of software components include network application server software, in one example IBM WebSphere® application server software; and database software, in one example IBM DB2® database software. (IBM, zSeries, pSeries, xSeries, BladeCenter, WebSphere, and DB2 are trademarks of International Business Machines Corporation in the United States, other countries, or both.)

Virtualization layer 62 provides an abstraction layer from which the following exemplary virtual entities may be provided: virtual servers; virtual storage; virtual networks, including virtual private networks; virtual applications; and virtual clients.

Management layer 64 provides the exemplary functions described below. Resource provisioning provides dynamic procurement of computing resources and other resources that are utilized to perform tasks within the Cloud computing environment. Metering and pricing provide cost tracking as resources are utilized within the Cloud computing environment, and billing or invoicing for consumption of these resources. In one example, these resources may comprise application software licenses. Security provides identity verification for users and tasks, as well as protection for data and other resources. User portal provides access to the Cloud computing environment for both users and system administrators. Service level management provides Cloud computing resource allocation and management such that required service levels are met. Service Level Agreement (SLA) planning and fulfillment provides pre-arrangement for, and procurement of, Cloud computing resources for which a future requirement is anticipated in accordance with an SLA.

Workloads layer 66 provides functionality for which the Cloud computing environment is utilized. Examples of workloads and functions which may be provided from this layer include: mapping and navigation; software development and lifecycle management; virtual classroom education delivery; data analytics processing; transaction processing; and Cloud roaming services.

As mentioned above, all of the foregoing examples described with respect to FIG. 3 are illustrative only, and the invention is not limited to these examples. In general, Cloud roaming services of workloads layer 66 implements the functions of the present invention as discussed herein. Along these lines, the present invention can be implemented in many fashions including the following examples:

Example 1

In one example, assume a tree-like structure of available Cloud services and the underlying Cloud providers to deliver them. For example, a desktop publishing service. In the ideal state, the preferred Cloud to provide this service may be 'Cloud 1'. If Cloud 1 becomes over-provisioned or otherwise unavailable, the link may change to Cloud 2 (a partner of Cloud 1). From the requestor perspective this is transparent. The requestor asks for 'DTP' and does (and should not need to) know which Cloud is providing it. This example is similar to roaming in a cell phone network.

Example 2

In another example, assume that a default Cloud service provider is 'Cloud 1'. Further assume that Cloud 1 is fully utilized, so it sends out an update message to all subscribed requestors saying 'Use a partner Cloud—'Cloud 2 Cloud Services'. Still yet, assume that the requestor is not able to contact 'Cloud 1 Cloud Services'—perhaps it is out of range or has another problem. In this case, the requestor uses a combination of local preference providers or a centralized Cloud provider directly to find out which Cloud service to 'roam' to. The algorithm covers the ability for the requestor to cross reference Cloud provider service (utility and warranty) to perform a 'best' matching. To this extent, note that the algorithm is two directional—both the requestor and the provider determine the Cloud to use for a specific function.

The present invention thus describes two scenarios—a pull and push model—to align requestor required services to currently available services from Cloud providers. The requestor has a profile determining a prioritized list of Cloud providers that may be used, OR the primary Cloud provider may outsource services to a partner cloud. The algorithm shows how the provider decides which requestors have access to which services—based on current utilization and forecast. Also, from a requestor perspective, location, roaming, network bandwidth and requestor processing capabilities (not inclusive) may be sent to the provider of Cloud services to determine whether a change is needed.

Figure 4:
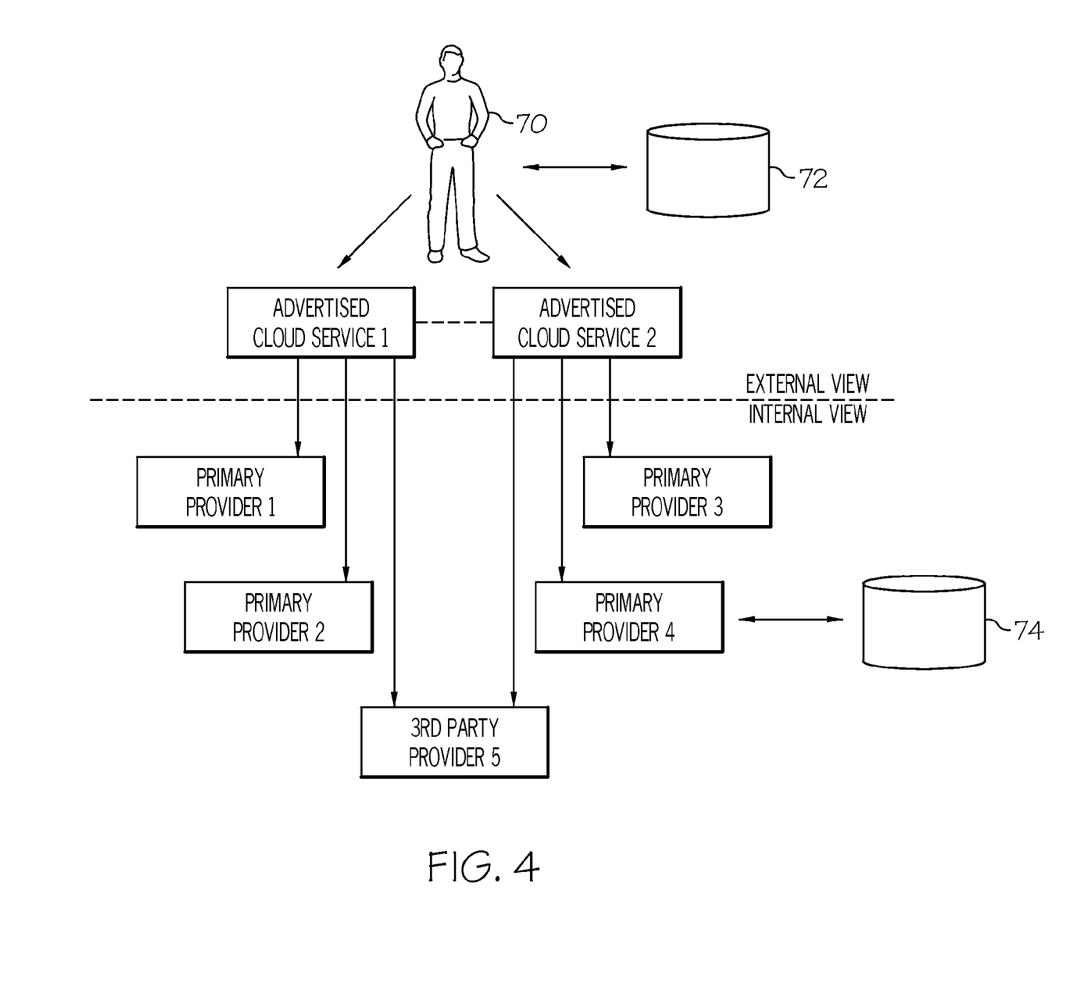
FIG. 4 shows an illustrative hierarchical diagram according to the present invention.

FIG. 4 shows a basic configuration of a Cloud requestor 70 requiring access to two advertised Cloud services—cloud service 1 and Cloud service 2. Providers 1, 2 and 5 are able to provide advertised Cloud service 1. Providers 3, 4 and 5 are able to provide advertised Cloud service 2. The algorithm described in detail herein determines which provider should be 'matched up' to the advertised services such that the requestor gets service. The profile of the requestor may dictate that, if available, provider 1 and 3 should be given preference over providers 2 and 4. In the case that both primary and secondary providers are unavailable, a third-party provider, provider 5, may be called for.

To determine how the algorithm works, it is important to understand the key underlying systems that the algorithm uses. Each are described below:
Requestor Profile A requestor profile must exist (e.g., in a profile registry/database 72, which can be similar to storage system 34) for each requestor 70 that requires the use of Cloud services. This profile typically includes (but is not limited to):

(1) Requestor name
  (2) Requestor ID
  (3) Location
  (4) Current network bandwidth available
  (5) Current amount of processing power available
  (6) Subscribed services list complete with preferred Cloud providers
  (7) Primary Cloud provider; and
  (8) Secondary Cloud provider The requestor profile determines the current state of the requestor—based on location information (for example, using GPS). The current statistics and details surrounding the availability of the requestor location must be kept up to date. An example may be "requestor is currently in x country, with y bandwidth available, connected to z Wi-Fi network". Included in the profile must be a list of Cloud services that the requestor is interested in. This list may be determined when the requestor registered with their primary Cloud provider. At the minimum, it may contain information such as "I am interested in DTP and document generation services".

This dynamic profile information is stored in two locations—with the requestor locally (so that information contained in the profile may be sent with a services request) AND on a central profile registry—the details of which are described below:

Central Profile Registry 72

As indicated above, the central profile registry 72 is a system, similar to an LDAP or UDDI directory such as storage system 34 of FIG. 1, that requestor 70 can continually upload current profile information to. This registry should be highly available and accessible to both requestors and Cloud providers via a multiple array of networks and locations. Although not described in the present invention, the registry may be a replication of multiple registries associated with different network segments to ensure that it is available as much as possible. These multiple registries may be synchronized in batch or real time. The key for the present invention is that it should be highly available and accessible.

Cloud Provider Registry 74

From the provider angle, all Cloud providers must also subscribe to a registry 74 detailing the services and capabilities (collectively referred to as characteristics) that they are currently able to provide. Based on information such as current and forecasted utilization and capacity, providers update this registry with which services they can currently provide. For example, Provider 1 may include "I have the capacity to service another 10 requestors for the DTP service" or "I am able to provide the document service to any requestor that wants to edit a document less than 100 pages". Again this registry must be highly available and accessible.

A key part to the system here is that the providers have the option of 'swapping out' a locally provisioned service to a partner provisioned service. For example, if provider 1 cannot provide a spreadsheet service (because it may be over utilized), provider 1 may state that "for any requests for me to provide spreadsheet services, please look at my partner, provider 2". Another key piece is that the provider must update the registry to include FROM WHICH LOCATIONS and FOR WHAT MINIMUM SPECIFICATION OF REQUESTOR the services are available for. For example, "I can provide a DTP service only for requestors currently residing on the Acme network in the USA." Similar to user profiles, provider profiles can be stored in a provider registry/database 74 such as storage system 34 of FIG. 1

Using the systems described above, the following steps detail how the algorithm works. Ongoing steps:

(1) Requestor 70 sends information to home provider or the central profile registry of current status.

(2) At the same time, each provider looks at current and forecasted information and posts this information to the Cloud provider registry.

(3) Requestor 70 profile shows a preferred set of Cloud providers. The profile may also specifically list secondary providers.

(4) Requestor 70 sends information as to current services 'WISH LIST'—for services that requestor 70 is interested in.

There are two modes in which requestor 70 can select a provider to fulfill a service—pull and push mode. Each are described below:

Pull Mode (Requestor 70 Controls Selection of Provider):

(1) Requestor 70 reads profile, determines primary provider.

(2) Requestor 70 reads the Cloud provider registry and determines whether primary provider has current capacity available to fulfill service. By reading the 'FROM WHICH LOCATIONS' information, requestor 70 can determine whether he or she is in a location that is capable of accessing and using the service.

(3) If the primary Cloud provider is NOT able to deliver the service, two options are available to requestor 70 (which should be prioritized in requestor 70 profile):

(a) Requestor 70 reads profile and determines whether any hard coded secondary provider is listed for the required service. If one is found, then that secondary provider information is searched in the Cloud provider registry.

(b) Requestor 70 reads the Cloud provider registry and looks to see whether the primary Cloud provider has delegated the service to a partner cloud. If a record is found, the secondary provider is searched in the Cloud provider registry.

(4) In either case, primary, secondary, tertiary, etc., Cloud providers are searched until a result is found.

(5) If no Cloud service providers are available, requestor 70 is informed that no Cloud services are currently available.

Push Mode (Providers Actively Find Requestor 70s)

(1) Provider looks at requestor registry and found out which requestor 70s are requiring services which the provider can service. It reads the 'WISH LIST'.

(2) If a match is found, and requestor 70 is in a location and has available network capacity to connect to the service, the provider sends out an 'I'm ready' signal to requestor 70.

(3) Requestor 70 is notified that a provider is available in the current location to fulfill the service should it be requested. Using requestor 70 profile, requestor 70 can determine which signals to keep and which to ignore. By using these signals, requestor 70 can have an up-to-date real-time status of available services and provider.

(4) If the provider determines that a requestor 70's "WISH LIST" requires a service but the provider is not able to fulfill it, it may contact a partner or secondary provider to have them automatically signal requestor 70.

(5) Requestor 70 always knows which services are available.

Figure 5:
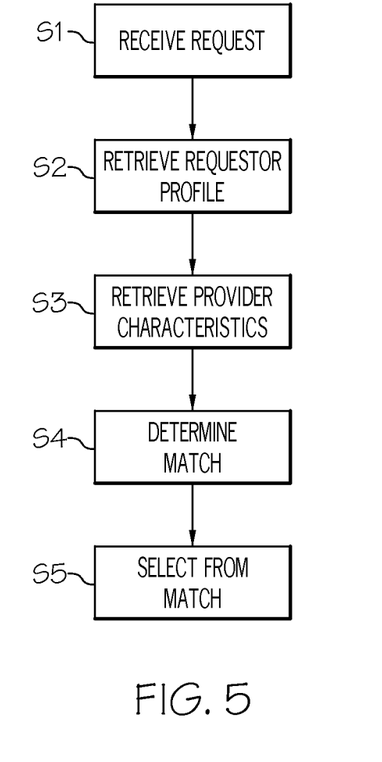
FIG. 5 shows a flow diagram of a method according the present invention.

These steps can be collectively viewed in the context of FIG. 5. As shown, in step S1, a request for a Cloud service is received from a requestor 70 in the Cloud computing environment. In step S2, the profile for the requestor is retrieved from a profile registry 72 while Cloud provider characteristics are retrieved from a Cloud provider registry 74. In step S4, a set of Cloud providers are for providing the Cloud service determined based on a best match between the requestor profile and the Cloud provider characteristics. In step S5, at least one Cloud provider is selected from the set.

The present invention can further provide the ability for a 'Dynamic Service Catalog' to be automatically generated for the use of requestor 70s. The catalog is based on the cross reference of requestor 70's WISH LIST and the currently available providers to give a personalized view as to which services are available. To achieve this, the following steps can be performed:

(1) Requestor 70 wants to know 'all' available services available to me at my current location. Requestor 70 decides that he or she wants to hear from not just primary and secondary providers, but all providers in that area. Requestor 70 also decides that he or she wants to see a list of all services—not just those in the "WISH LIST".

(2) Requestor 70 connects to the Cloud provider registry and pulls up records of ALL providers that can service ALL service types.

(3) Catalog page is automatically created and presented to requestor 70.

(4) Requestor 70 can browse the catalog and select services at will.

This automated service catalog may be enhanced to include automatic pub/sub capabilities to be notified when new providers or new services are available.

While shown and described herein as a Cloud roaming solution, it is understood that the invention further provides various alternative embodiments. For example, in one embodiment, the invention provides a computer-readable/useable medium that includes computer program code to enable a computer infrastructure to provide Cloud roaming functionality as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.), and/or as a data signal (e.g., a propagated signal) traveling over a network (e.g., during a wired/wireless electronic distribution of the program code).

In another embodiment, the invention provides a method that performs the process of the invention on a subscription, advertising, and/or fee basis. That is, a service provider, such as a Solution Integrator, could offer to provide Cloud roaming functionality. In this case, the service provider can create, maintain, support, etc., a computer infrastructure, such as computer system 12 (FIG. 1) that performs the process of the invention for one or more customers. In return, the service provider can receive payment from the customer(s) under a subscription and/or fee agreement and/or the service provider can receive payment from the sale of advertising content to one or more third parties.

In still another embodiment, the invention provides a computer-implemented method for providing Cloud roaming functionality. In this case, a computer infrastructure, such as computer system 12 (FIG. 1), can be provided and one or more systems for performing the process of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the process of the invention.

As used herein, it is understood that the terms "program code" and "computer program code" are synonymous and mean any expression, in any language, code, or notation of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory element(s) through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output or device devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for providing Cloud roaming services in a Cloud computing environment, comprising:
   receiving a request for a Cloud service from a requester in the Cloud computing environment;
   determining a set of Cloud providers capable of providing the requested Cloud service based on a profile of the requester and a capability of each of the set of Cloud providers; and
   making a selection to match the requester with at least one of the set of Cloud providers based upon a match between the profile and the capability, wherein the matching can be initiated and controlled by both the requester, by analyzing the set of Cloud providers to determine a Cloud to fulfill the request, and the at least one of the set of Cloud providers, by analyzing the profile of the requester from among a plurality of profiles from a plurality of requesters to find the request for the Cloud service and indicating an availability and capability to the requester.

2. The method of claim 1, further comprising:
   retrieving the profile from a profile registry; and
   retrieving Cloud provider characteristics from a Cloud provider registry, the capability being based on the Cloud provider characteristics.

3. The method of claim 1, the best match being based on a location, a bandwidth, and a network connectivity of the requester.

4. The method of claim 1, the making comprising:
   identifying the set of Cloud providers to the requester; and
   receiving a selection of at least one of the set of Cloud providers.

5. The method of claim 1, further comprising providing the Cloud service via the selection.

6. The method of claim 5, the selection comprising at least one primary Cloud provider capable of providing the Cloud service, and at least one secondary Cloud provider capable of providing the Cloud service.

7. The method of claim 6, further comprising roaming from the primary Cloud provider to the secondary Cloud provider.

8. A Cloud system for providing Cloud roaming services in a Cloud computing environment, comprising:
   at least one memory device comprising instructions;
   a bus coupled to the at least one memory device;
   a processor coupled to the bus that when executing the instructions causes the Cloud system to:
   receive a request for a Cloud service from a requester in the Cloud computing environment;
   determine a set of Cloud providers capable of providing the requested Cloud service based on a profile of the requester and a capability of each of the set of Cloud providers; and
   make a selection to match the requester with at least one of the set of Cloud providers based upon a match between the profile and the capability, wherein the matching can be initiated and controlled by both the requester, by analyzing the set of Cloud providers to determine a Cloud to fulfill the request, and the at least one of the set of Cloud providers, by analyzing the profile of the requester from among a plurality of profiles from a plurality of requesters to find the request for the Cloud service and indicating an availability and capability to the requester.

9. The Cloud system of claim 8, the memory medium further comprising instructions that when executed by the processor causes the Cloud system to:
   retrieve the profile from a profile registry; and
   retrieve Cloud provider characteristics from a Cloud provider registry, the capability being based on the Cloud provider characteristics.

10. The Cloud system of claim 8, the best match being based on a location, a bandwidth, and a network connectivity of the requester.

11. The Cloud system of claim 8, the memory medium further comprising
   instructions that when executed by the processor causes the Cloud system to:
      identify the set of Cloud providers to the requester; and
      receive a selection of at least one of the set of Cloud providers.

12. The Cloud system of claim 8, the memory medium further comprising instructions that when executed by the processor causes the Cloud system to provide the Cloud service via the selection.

13. The Cloud system of claim 12, the selection comprising at least one primary Cloud provider capable of providing the Cloud service, and at least one secondary Cloud provider capable of providing the Cloud service.

14. The Cloud system of claim 13, the memory medium further comprising instructions that when executed by the processor causes the Cloud system to roam from the primary Cloud provider to the secondary Cloud provider.

15. A computer readable storage device containing a program product for providing Cloud roaming services in a Cloud computing environment, the computer readable medium comprising program code for causing a computer to:
   receive a request for a Cloud service from a requester in the Cloud computing environment;
   determine a set of Cloud providers capable of providing the requested Cloud service based on a profile of the requester and a capability of each of the set of Cloud providers; and
   make a selection to match the requester with at least one of the set of Cloud providers based upon a match between the profile and the capability, wherein the matching can be initiated and controlled by both the requester, by analyzing the set of Cloud providers to determine a Cloud to fulfill the request, and the at least one of the set of Cloud providers, by analyzing the profile of the requester from among a plurality of profiles from a plurality of requesters to find the request for the Cloud service and indicating an availability and capability to the requester.

16. The computer readable storage device containing the program product of claim 15, the computer readable medium further comprising program code for causing the computer to:
   retrieve the profile from a profile registry; and
   retrieve Cloud provider characteristics from a Cloud provider registry, the capability being based on the Cloud provider characteristics.

17. The computer readable storage device containing the program product of claim 15, the best match being based on a location, a bandwidth, and a network connectivity of the requester.

18. The computer readable storage device containing the program product of claim 15, the computer readable medium further comprising program code for causing the computer to:
   identify the set of Cloud providers to the requester; and
   receive a selection of at least one of the set of Cloud providers.

19. The computer readable storage device containing the program product of claim 15, the computer readable medium further comprising program code for causing the computer to provide the Cloud service via the selection.

20. The computer readable storage device containing the program product of claim 19, the selection comprising at least one primary Cloud provider capable of providing the Cloud service, and at least one secondary Cloud provider capable of providing the Cloud service.

21. The computer readable storage device containing the program product of claim 20, the computer readable medium further comprising program code for causing the computer to roam from the primary Cloud provider to the secondary Cloud provider.

22. A method for deploying a system for providing Cloud roaming services in a Cloud computing environment, comprising:
   providing a Cloud computing system being operable to:
   receive a request for a Cloud service from a requester in the Cloud computing environment;
   determine a set of Cloud providers capable of providing the requested Cloud service based on a profile of the requester and a capability of each of the set of Cloud providers; and
   make a selection to match the requester with at least one of the set of Cloud providers based upon a match between the profile and the capability, wherein the matching can be initiated and controlled by both the requester, by analyzing the set of Cloud providers to determine a Cloud to fulfill the request, and the at least one of the set of Cloud providers, by analyzing the profile of the requester from among a plurality of profiles from a plurality of requesters to find the request for the Cloud service and indicating an availability and capability to the requester.

* * * * *